United States Patent [19]

Lange et al.

[11] 4,264,174

[45] Apr. 28, 1981

[54] MECHANISM FOR RETRACTING AND EXTENDING THE LENS CARRIER OF A CAMERA

[75] Inventors: Karl H. Lange, Bünde; Michael Cheavin, Enger, both of Fed. Rep. of Germany

[73] Assignee: Balda Werke Graf H. & Company KY, Fed. Rep. of Germany

[21] Appl. No.: 95,340

[22] Filed: Nov. 19, 1979

[30] Foreign Application Priority Data

Nov. 25, 1978 [DE] Fed. Rep. of Germany ....... 2851077

[51] Int. Cl.³ .............................................. G03B 17/04
[52] U.S. Cl. .................................................. 354/187
[58] Field of Search ............................. 354/187–195, 354/288

[56] References Cited

U.S. PATENT DOCUMENTS

| | | | |
|---|---|---|---|
| 2,759,405 | 8/1956 | Harter | 354/191 |
| 4,137,782 | 2/1979 | Lange | 354/195 X |

*Primary Examiner*—John Gonzales
*Attorney, Agent, or Firm*—Jacobs & Jacobs

[57] ABSTRACT

Apparatus for retracting and extending the lens carrier of a camera comprises epicyclic gearing having a planetary gear mounted on a web and a driving pin mounted on the planetary gear for moving the lens carrier, and a stop for stopping the extension of the lens carrier at a picture-ready position, the center of the driving pin and the central axis of the web both lying, when the lens carrier engages the stop, on a line which extends at least approximately parallel to the lens axis.

9 Claims, 4 Drawing Figures

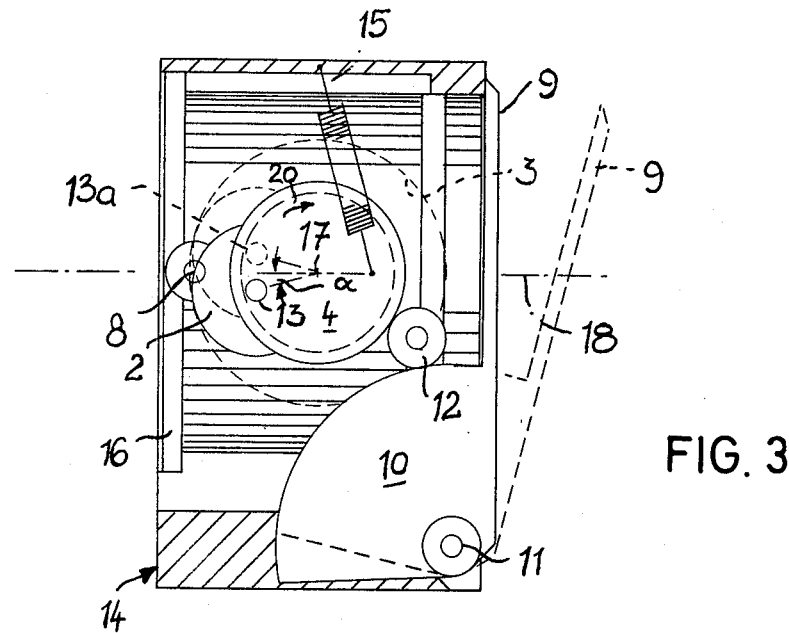
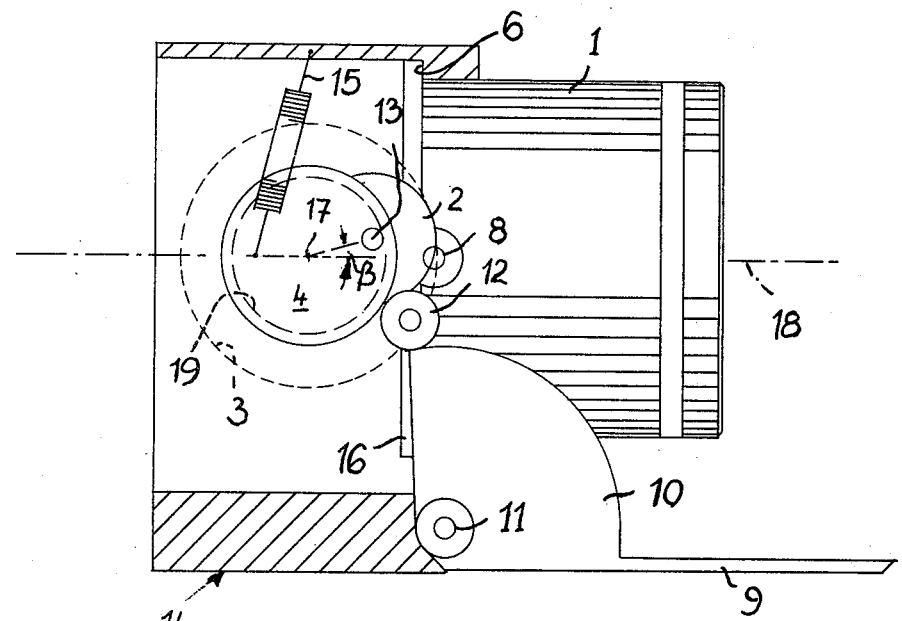

MECHANISM FOR RETRACTING AND EXTENDING THE LENS CARRIER OF A CAMERA

The present invention relates to a device for the retracting and extending of the lens carrier of a camera by means of an epicyclic gearing which has a web supported for rotation around a fixed central axis on which web there is rotatably mounted a planet gear which travels on a fixed internal gear arranged concentrically to the central axis and has a driving pin or the like which is in engagement with the lens carrier.

One known device of this type (German Utility Model No. 77 02 533) has a drive member which at the same time serves as adjustment means for the distance setting. In this known device, the lens housing is extended from a recessed position to different positions of extension by means of the distance setting knob. The location of the extended position in this known device is a function of the distance setting selected.

The known device has the disadvantage that after each retraction of the lens housing the distance must be at all times reset. This is a considerable disadvantage since due to this, the camera is frequently not ready sufficiently rapidly to take a picture.

Based on the aforementioned device, the object of the present invention is to improve this device so that extension from a recessed position to a precisely defined, fixed and secured extended position to which the lens housing returns upon each extension process is made possible.

In order to achieve this, the present invention provides that a region of the lens carrier rests, in the picture-ready position, against a stop which is fastened to the housing and that the web passes through an angle of swing of about 180° between the recessed position and the outer stop position of the lens carrier, the center of the driver pin or the like and the central axis lying in the stopped position of the lens carrier on a line which is at least approximately parallel to the axis of the lens.

The device in accordance with the invention makes possible a reliable play-free guiding of the lens housing up into its stopped position in extended condition. By the use of the features in accordance with the invention, there is obtained in this way a very simple solution of the problem of reliably locking the lens in the extended position. This is possible in the construction according to the invention without an expensive stop means which are required with other extension devices of this type. The wedge elements known from other solutions of this type, which are necessary therein in order to obtain a dependable locking in extended position and which can be moved again out of their locked position only by other additional elements, can be dispensed with. In the case of the present invention, an absolutely reliable interlocking is obtained solely by the development in accordance with the invention of the extension mechanism.

With the construction of the invention, it is possible to select the pressing pressure of the lens housing within the region of the outer stop position as large as desired. This is the result of the fact that a finite rotation of the gearing can lead to a practically infinitely small movement of longitudinal displacement. The same phenomenon leads in the recessed position, to the lens housing in its recessed position moving over comparatively small paths for relatively large angles of rotation of the gear means. This makes it possible for the parts of the epicyclic gearing to move over considerable paths of rotation before the lens is noticeably extended forward. This is advantageous in connection with covering means which—if they are also to serve as drive means for the gearing—must be moved as far as possible out of the unobstructed extension space of the lens before any substantial movement of extension of the lens tube commences.

In accordance with another feature of the invention, the connecting plane through the central axis and the axis of rotation of the planet gear lies, in the stop position of the lens carrier, behind the plane determined by the central axis of the lens and the central axis of the arm by an acute angle of preferably less than 20°, as seen in the direction of rotation for extension of the web.

Furthermore, it is preferred that the plane determined by the central axis and the axis of rotation of the plant gear in the recessed position of the lens carrier be located behind the plane determined by the central axis and the lens axis by an acute angle of less than 30° as seen in the direction of rotation for extension of the web.

Such a development of the device in accordance with the invention reinforces the effect already described, namely that in the vicinity of the dead center only a slight longitudinal movement of the lens housing corresponds to a comparatively large angle of rotation of the web. Upon displacement of the starting position of the axis of rotation of the plant wheel to in front of the dead-center position and therefore in front of a position which lies on the plane determined by the central axis and the lens axis, the driver pin, upon a swinging of the web gear in direction of extension, travels first of all in a direction towards the rear wall of the camera, namely an extremely small distance. The following motion of the lens housing is at first also small, but directed outwards. A comparatively large angle of rotation of the web, which can also be developed as a web gear, corresponds to both longitudinal displacements of the lens housing effected in the vicinity of the dead center.

It has been found useful for the pitch diameter of the fixed internal gear to be twice as large as the pitch diameter of the planet gear and for the center of the driver pin or the like to lie on the pitch circle of the planet gear.

With such a selection of the gear ratios, there is linear movement of the driver pin or the like, which in this case need merely engage into a borehole in the lens housing. With a shape of the epicyclic gearing which differs from the conditions mentioned above, the driver pin does not carry out a linear movement parallel to the axis of the lens but rather a curved movement which also has a transverse component. In such a case, transverse guides would have to be provided on the lens carrier, which could receive the transverse movement of the driver pin which takes place in addition to the longitudinal movement.

It has been found particularly suitable to provide a beyond-dead-center spring system which pulls or pushes the lens housing into the two end positions.

By the provision of the beyond-dead-center spring system, there is obtained an additional securing of the lens housing in the two defined end positions of the lens housing. With suitable dimensioning of the beyond-dead-center spring, the lens housing automatically snaps, from an intermediate position, after release of the drive either into the one end position or into the other end position.

It has been found particularly suitable that a toothing connected with a swingable covering flap for the lens housing also be in engagement possibly via an intermediate gear with the toothing of the web which is developed as web gear.

The drive of the lens housing takes place, with this suitable solution, therefore, by an actuation of the swingable cover flap and no further actuating handle is necessary.

It has been found particularly suitable for the fixed internal gear to be developed on the camera housing, which consists at least in part, of plastic.

Furthermore, in accordance with another feature of the invention, it is advisable for the journal diameter of the web to correspond to at least the sum of twice the eccentricity of the web plus the diameter of the journal pin of the planet gear. With such a development of the diameter of the journal, it is possible to construct the gearing of a particularly small number of individual parts and to effect the mounting in simple manner.

Finally, it is also proposed, in accordance with the invention, that two such devices be provided, arranged diametrically opposite each other on different sides of the lens housing. In this way, additional guide means are dispensed with. A play-free guidance of the lens housing is made possible solely by the provision of two of the devices in accordance with the invention.

A preferred embodiment of the invention will be described in detail below with reference to the drawing, in which:

FIG. 3 is a vertical longitudinal section parallel to the axis of the lens through the camera housing with a diagrammatic view of the epicyclic gearing in the recessed position of the lens housing; and FIG. 4 is a view similar to FIG. 3 with the lens housing in its fully extended position.

Figure 1:
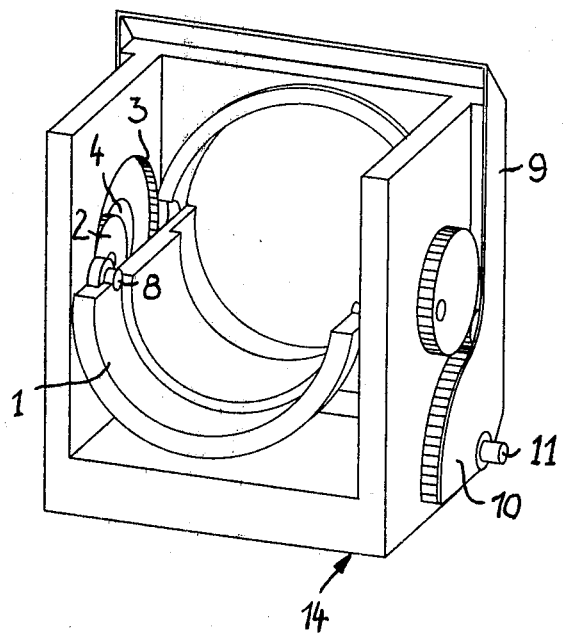
FIG. 1 is a rear perspective view, partially broken away, of a part of a camera housing with the lens housing shown cut open and the front cover flap shown closed.
Figure 2:
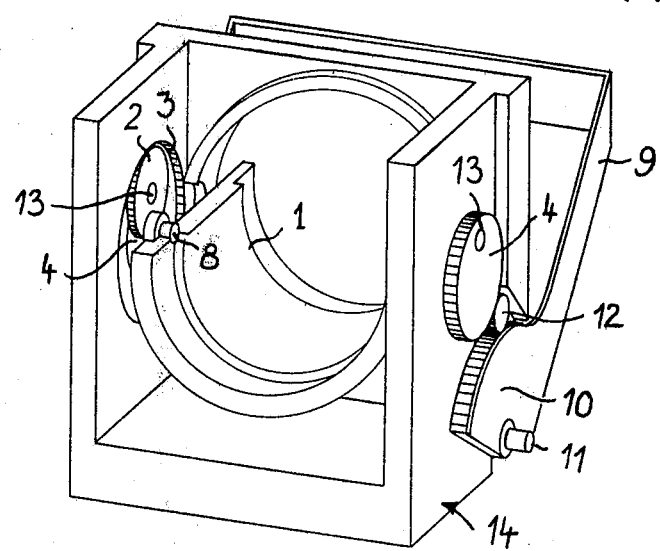
FIG. 2 is a view similar to FIG. 1 with the cover flap partly open.

Referring to FIG. 1, lens carrier 1 is retractable and extendable via an epicyclic gearing within the housing 14 of a camera, shown only in part. Two such epicyclic gearings are provided, namely on diametrically opposite sides of the lens carrier 1. In front of the lens carrier, a cover flap 9 is supported in the housing 14 swingable about journal pins 11. On the cover flap 9, there are seated laterally two toothed segments 10, each of which is in engagement via intermediate gear 12 (FIG. 2) with a web, developed as web gear 4, of a planetary gearing. On the web gear 4, a planet gear 2 is rotatably supported eccentrically by means of a journal pin 13. Since the same gear parts are provided on both sides, the description of one gearing is sufficient.

The planet gear 2 travels on a fixed internal gear 3 formed in fixed position in housing 14. A driver pin 8 is arranged on the pitch circle of the planet gear 2, its center extending through the pitch circle.

Concentric to the fixed inner gear 3, the web gear 4 is supported in a mount 19 (FIG. 4). The diameter of the surface bearing of the web gear 4, i.e. the distance from the axis of web gear 4 to the axis of pin 13 corresponds approximately to the sum of twice the eccentricity of the web gear 4 plus the diameter of the journal pin 13 of the planet gear 2.

The central axis 17 of the mount 19 coincides with the central axis of the fixed inner gear 3.

In the extended position of the lens carrier 1 stop ring 16, which is provided at the rear end of the lens carrier 1, lies firmly against a stop 6 of the housing 14. 18 is the axis of the lens.

The pin 8 is developed as a driver pin and engages into a lateral borehole of the lens carrier 1. Upon a turning of the web gear 4, the pin 8 travels on a straight line which extends parallel to the axis 18 of the lens.

A spring 15, which is fastened on one side to the housing 14 and on the other side to the web gear 4, acts as a beyond-dead-center spring. In the retracted position of the lens carrier 1, it assumes the position shown in FIG. 3 while in the extended position it lies in the position shown in FIG. 4.

In the embodiment shown, the pin 13, in the retracted position of the lens carrier 1, lies in a plane determined by the central axis 17 and the journal pin 13, which plane lies behind the plane determined by the lens axis 18 and the central axis 17 by the angle $\alpha$ in the direction of rotation for extension (see arrow 20). Upon a swinging of the cover flap 9 into the open position (see FIG. 4), the cover flap 9 moves through an intermediate position which is shown in dashed line in FIG. 3. The position shown in 13a in dashed line of the journal pin 13 corresponds to said dashed-line position of the cover flap 9.

In the extended position of the lens carrier 1, (see FIG. 4), the stop ring 16 lies firmly against the stop 6 of the housing 14. In this position, the center of the journal pin 13 lies in a plane determined by said center and the central axis 17. This plane lies behind the plane determined by the lens axis 18 and the central axis 17 by an angle $\beta$, as seen in direction of rotation for extension.

Between the retracted position shown in FIG. 3 and the extended position shown in FIG. 4, the journal pin 13 has passed through an angle of about 180°. In practice, the preferred angle $\alpha$ will be less than 30° while the preferred angle $\beta$ is also an acute angle and less than 20°.

The linear movement of the driver pin 8 is assured by the fact that the pitch diameter of the fixed internal gear 3 is twice as great as the pitch diameter of the planet gear 2. In this connection, the center of the driver pin 8 or of a corresponding driver member lies on the pitch circle of the planet gear. If these geometrical conditions are deviated from, the driver pin 8 does not move on a straight line. In such a case, it is not sufficient to provide merely a receiving bore for the driving pin in the lens carrier, but rather in this case a possibility of movement must be provided also transverse to the plane determined by the central axis 17 and the lens axis 18, for instance by a longitudinal guide in the lens carrier 1.

We claim:

1. In a camera having a lens carried by a lens carrier movable between a retracted position inside the camera housing and an extended position outside the camera housing, the improvement which comprises a mechanism for moving said lens carrier between said retracted and extended positions, said mechanism comprising epicyclic gear means for moving said lens carrier, including a toothed web gear supported for rotation around a fixed central axis and movable between first and second positions to retract and extend said lens carrier, a fixed internal gear arranged concentrically to said central axis, a planet gear rotatably supported on said web gear for movement on said internal gear, and a driving pin means for moving said lens carrier mounted on said planet gear; a stop fastened to said housing; said lens carrier having a region operable to engage said stop as the lens carrier is extended from the retracted position, said lens carrier being in picture ready position when said region engages said stop; and a lens cover for said lens housing movable between a normally closed position and a fully open position, said lens cover having toothing in engagement with said toothing of said web gear, said lens cover cover being operable via its toothing to operate said web gear as the lens cover is moved between said normally closed position and said fully open position, said web gear being operable to pass through an angle of swing of about 180° as it moves between said first and second positions, said first position corresponding to the retracted position of the lens carrier and said second position corresponding to the extended position of said lens carrier; and the center of the driving pin means and said central axis both lie, when the lens carrier engages said stop, on a line which extends at least approximately parallel to the axis of the lens.

2. Apparatus according to claim 1, wherein the plane determined by said central axis and the axis of rotation of the planet gear, when the lens carrier engages said stop, lies behind the plane determined by the axis of the lens and said central axis by an acute angle of less than 20°, as seen in the direction of rotation for extension of the web.

3. Apparatus according to claim 1, wherein the plane determined by said central axis and the axis of rotation of the planet gear, when said lens carrier is in the retracted position, lies behind the plane determined by the axis of said lens and said central axis by an acute angle of less than 30°, as seen in the direction of rotation for extension of the web.

4. Apparatus according to claim 1, wherein the pitch diameter of the fixed internal gear is twice as large as the pitch diameter of the planet gear, and the center of the driving pin means lies on the pitch circle of the planet gear.

5. Apparatus according to claim 1, wherein a beyond-dead-center spring system is provided which pulls or pushes the lens carrier to its two positions.

6. Apparatus according to claim 1, wherein intermediate gear means is provided between said lens cover toothing and said web gear.

7. Apparatus according to claim 1, wherein the fixed internal gear is formed on the camera housing, and the camera housing, at least at the part forming the internal gear, is of plastic.

8. Apparatus according to claim 1, wherein said planet gear is rotatably supported on said web gear via a journal pin, and the diameter of the bearing surface of the web gear is at least the sum of twice the eccentricity of the web gear plus the diameter of the journal pin.

9. Apparatus according to claim 1, wherein two such mechanisms are provided, arranged on diametrically opposite sides of the lens arrier.

* * * * *

UNITED STATES PATENT AND TRADEMARK OFFICE
CERTIFICATE OF CORRECTION

PATENT NO. : 4,264,174
DATED : April 28, 1981
INVENTOR(S) : LANGE, KARL HEINZ et al It is certified that error appears in the above-identified patent and that said Letters Patent are hereby corrected as shown below:

In item 73 on the title page, the name of the assignee should read

-- Balda Werke GmbH & Co. KG --.

Signed and Sealed this

First Day of September 1981

[SEAL]

*Attest:*

*Attesting Officer*

GERALD J. MOSSINGHOFF

*Commissioner of Patents and Trademarks*